United States Patent [19]

Kokaji et al.

[11] Patent Number: 4,518,970
[45] Date of Patent: May 21, 1985

[54] METHOD FOR FORMING A LATENT IMAGE AND APPARATUS FOR CARRYING OUT THE SAME

[75] Inventors: Norio Kokaji, Hino; Kunio Kinoshita, Hachioji, both of Japan

[73] Assignee: Iwatsu Electric Co., Ltd., Tokyo, Japan

[21] Appl. No.: 652,160

[22] Filed: Sep. 18, 1984

Related U.S. Application Data

[63] Continuation of Ser. No. 370,135, Apr. 20, 1982, abandoned.

[30] Foreign Application Priority Data

Apr. 21, 1981 [JP] Japan .................. 56-60318

[51] Int. Cl.$^3$ ............................................. G01D 15/12
[52] U.S. Cl. ..................... 346/74.2; 346/74.5
[58] Field of Search ............. 346/74.2, 74.5, 139 C, 346/153.1; 358/301, 300; 360/57

[56] References Cited

U.S. PATENT DOCUMENTS

| | | | |
|---|---|---|---|
| 4,072,957 | 2/1978 | Kokaji et al. | 346/74.2 |
| 4,161,738 | 7/1979 | Kokaji | 346/74.2 |
| 4,251,822 | 2/1981 | Hara et al. | 346/139 C |

Primary Examiner—Thomas H. Tarcza
Attorney, Agent, or Firm—Paul & Paul

[57] ABSTRACT

A magnetic printing apparatus provides a recording head having a plurality of channels with different tracking widths. A locus is described by a preceding channel having a wide tracking width, another locus is described being partly overlapped on said locus by using a succeeding channel having a narrow tracking width. The width of locus described by the preceding channel is so corrected as will become nearly equal to the tracking width of the succeeding channel, while the overlapped portion of said locus is written into the succeeding channel.

4 Claims, 11 Drawing Figures (a)

(b)

| Fig. 7A |
|---|
| Fig. 7B |

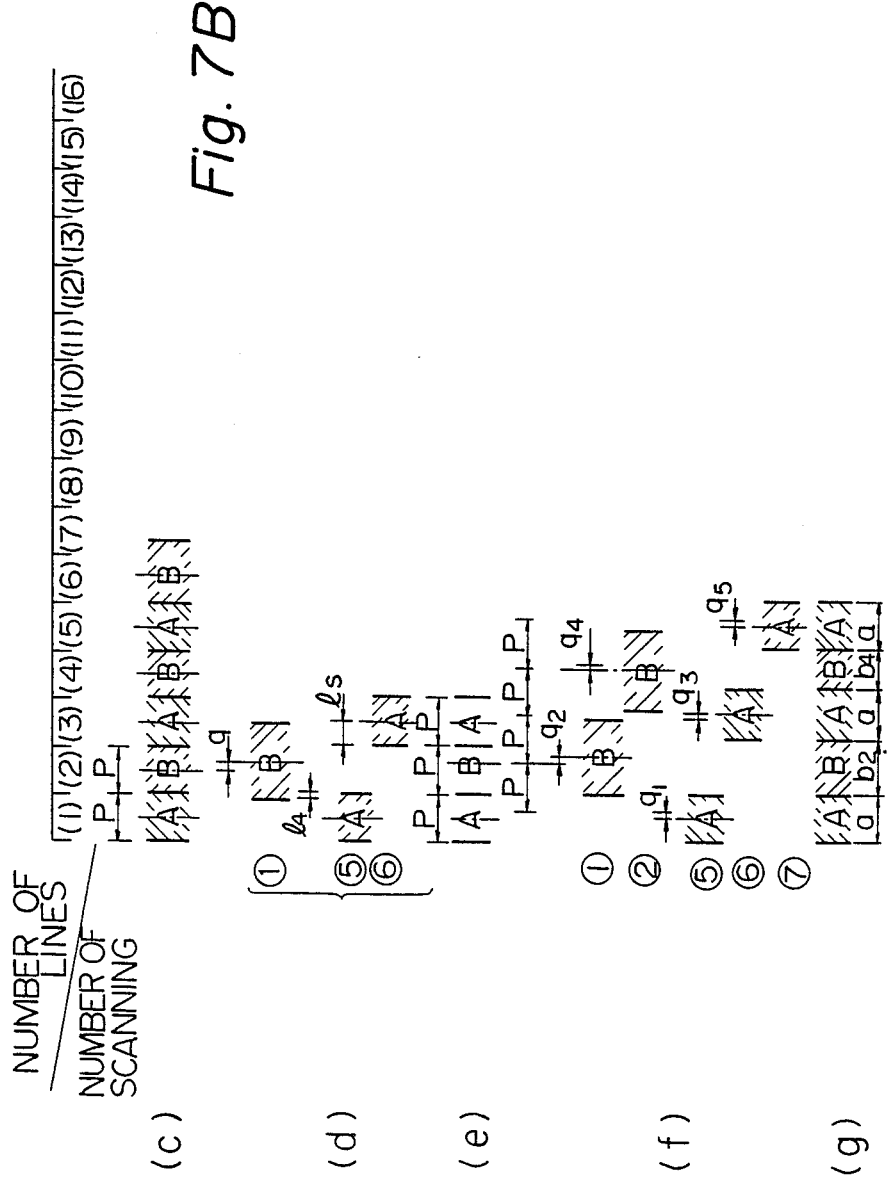

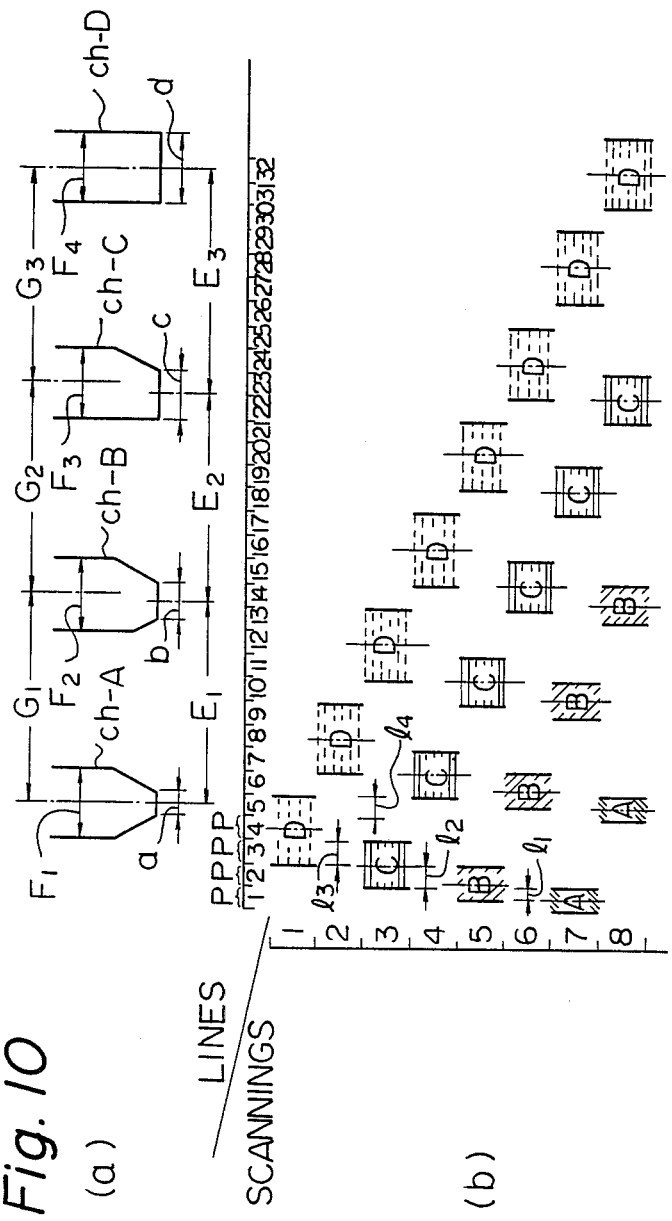

METHOD FOR FORMING A LATENT IMAGE AND APPARATUS FOR CARRYING OUT THE SAME

This application is a continuation of application Ser. No. 370,135, filed 04/20/82, now abandoned.

FIELD OF THE INVENTION

The present invention relates to a method and apparatus for a forming latent image in a magnetic printing apparatus, more particularly to a method and apparatus for forming a latent image using a recording head which has a multiplicity of channels.

BACKGROUND OF THE INVENTION

The use of a multichannel head for the high-speed formation of latent images inevitably results in poorer picture quality due to insufficient machining precision of the head or insufficient precision of the head-moving mechanism. That is, it is difficult to provide channels having an equal tracking width. It is also difficult to eliminate errors that stem from the tracking differences of the channels and the moving quantity of subscanning. The latter problem involves not only errors resulting from machining precision but also vibration resulting when the recording head moves in the subscanning direction. Therefore, subscanning involves variance in the feeding pitch.

OBJECT AND SUMMARY OF THE INVENTION

The object of the present invention is to obtain copies of high picture quality by substantially compensating for errors in precision.

For the purpose of achieving the above-mentioned object, there is provided a method of forming a latent image in a magnetic printing apparatus, characterized in that use is made of a recording head having a plurality of channels with different tracking widths, a locus is described by a preceding channel having a wide tracking width, another locus is described being partly overlapped on said locus by using a succeeding channel having a narrow tracking width, and the width of the locus described by the preceding channel is so corrected as to become nearly equal to the tracking width of the succeeding channel while the overlapped portion of said locus is rewritten into the succeeding channel.

Further, according to the present invention, there is provided an apparatus of forming a latent image in a magnetic printing apparatus, which includes a memory selector which receives the data to be recorded, memories which have a number of channels and which receive the data stored in said memory selector so as to supply said channel, and a plurality of recording heads corresponding to said channels which receive the data stored in said each memory, characterized by the provision of said recording head, having a multiplicity of channels which have such a relation that the preceding channels have wider tracking widths than the tracking widths of the succeeding channels, and by the provision of overlapping means, which so moves said recording head that part of the loci described by the preceding channels are overlapped by part of the loci described by the succeeding channels.

Further features and advantages of the present invention will be apparent from the ensuing description with reference to the accompanying drawings, to which, however, the scope of the invention is in no way limited.

BRIEF DESCRIPTION OF THE DRAWING

FIG. 10 is a diagram illustrating another embodiment of the present invention.

DETAILED DESCRIPTION OF THE INVENTION

Figure 1:
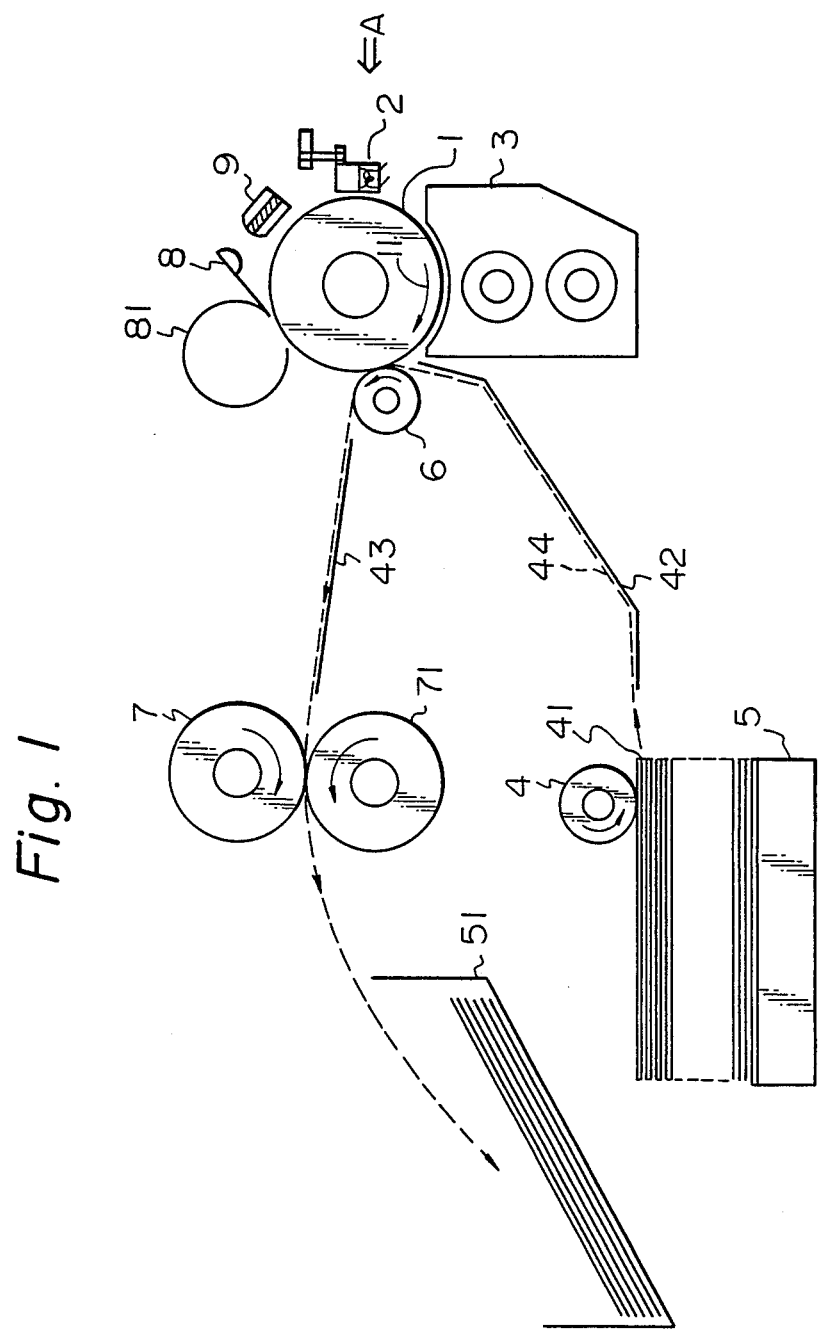
FIG. 1 illustrates a magnetic printing apparatus to which the present invention is adapted.
Figure 2:
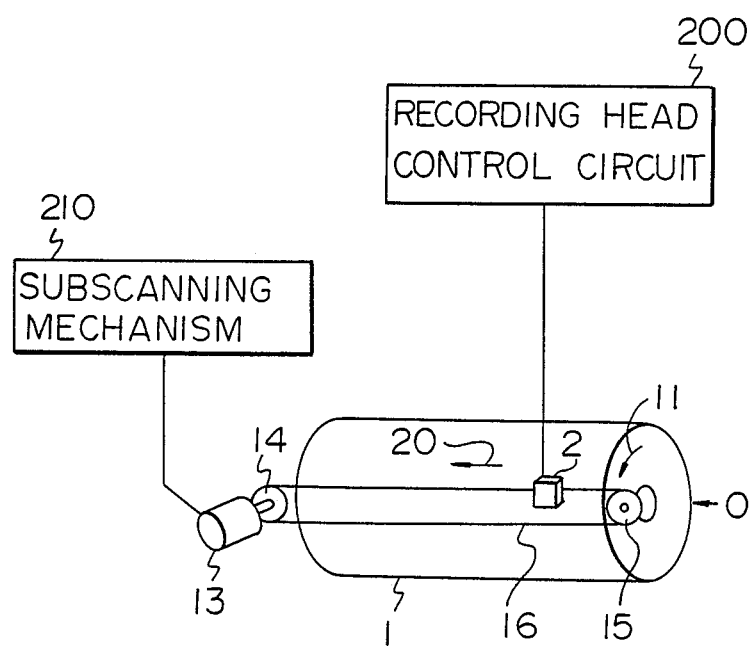
FIG. 2 is a view of FIG. 1 seen from the direction of arrow A.

FIG. 1 illustrates a magnetic printing apparatus to which the present invention is adapted. FIG. 2 is a view of FIG. 1 seen from the direction of arrow A. In FIG. 1, a recording drum 1 has on its surface a magnetic recording medium composed of Co-Ni-P and the like and rotates in the direction of arrow 11. A recording head 2 forms a magnetic latent image on the recording drum 1. The latent image is formed by the scanning. The direction in which the recording drum 1 rotates is referred to as the main scanning direction, and the axial direction of the recording drum 1 is referred to as the subscanning direction. The recording head 2 is moved in the direction of arrow 20 by the subscanning mechanism which consists, as shown in FIG. 2, of a subscanning motor 13 (such as a pulse motor), pulleys 14, 15, and a wire 16, thereby to form the latent image. As the formation of one page of latent image is finished, a magnetic toner is supplied from a developer 3 onto the recording drum 1, so that the magnetic latent image is converted into a visible image. A paper 41 is supplied by a paper-feed roller 4 from a paper stacker 5 and is transferred through a path indicated by a broken line 44 along a paper-feed guide 42. The magnetic toner bearing the visible image is transferred onto the paper 41 by a transfer roller 6. The paper 41 is then fed to the fixing rollers 7, 71 along a paper-feed guide 43. After the image is fixed by heat or pressure, the paper 41 is discharged into a stacker 51.

Figure 3:
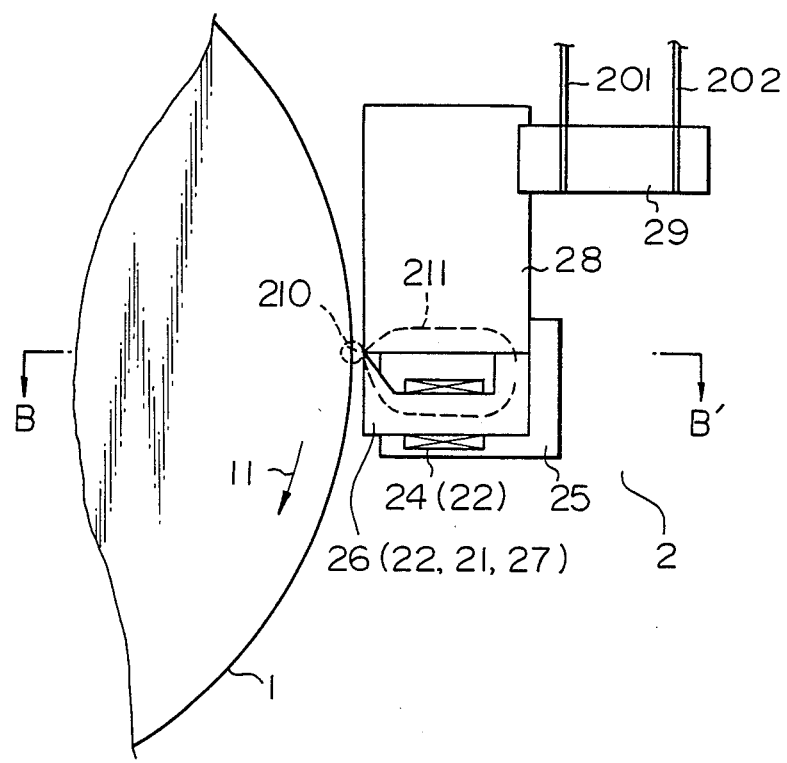
FIG. 3 is a diagram illustrating, on an enlarged scale, the relation between the recording drum and the recording head shown in FIG. 1.
Figure 4:
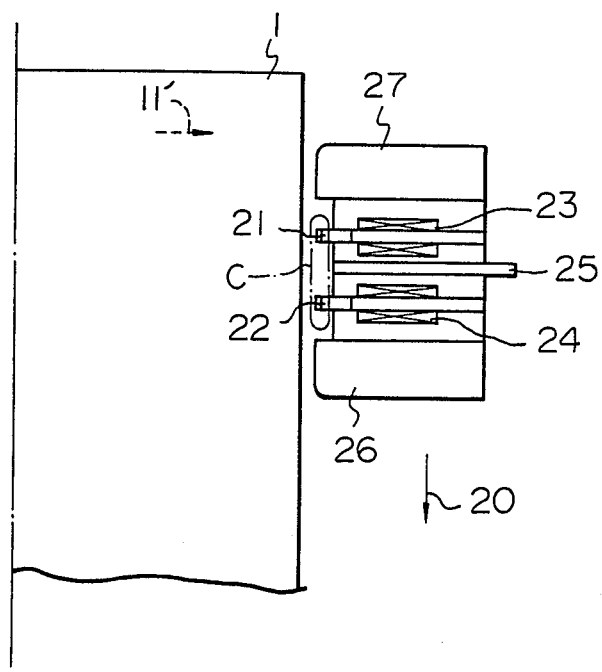
FIG. 4 is a view along the line B—B' of FIG. 3.

FIG. 3 is a diagram illustrating, on an enlarged scale, portions of the recording drum 1 and the recording head 2 of FIG. 1. FIG. 4 is a view along the line B—B' of FIG. 3. To simplify the description, the recording head 2 has two channels. A coil 23 is wound on a core 21 of channel A (hereinafter referred to as ch-A), a coil 24 is wound on a core 22 of channel B (hereinafter referred to as ch-B), and a shield plate 25 is placed between the two cores 21 and 22. Reference numeral 210 denotes a butting gap, and broken line 211 denotes lines of magnetic force. A slider is constituted as designated at 26, 27, and 28. Recording head 2 floats by dynamic pressure when the recording drum 1 turns at high speeds. Recording head 2 is supported by the subscanning mechanism via a core support 29 and leaf springs 201, 202.

Figure 5:
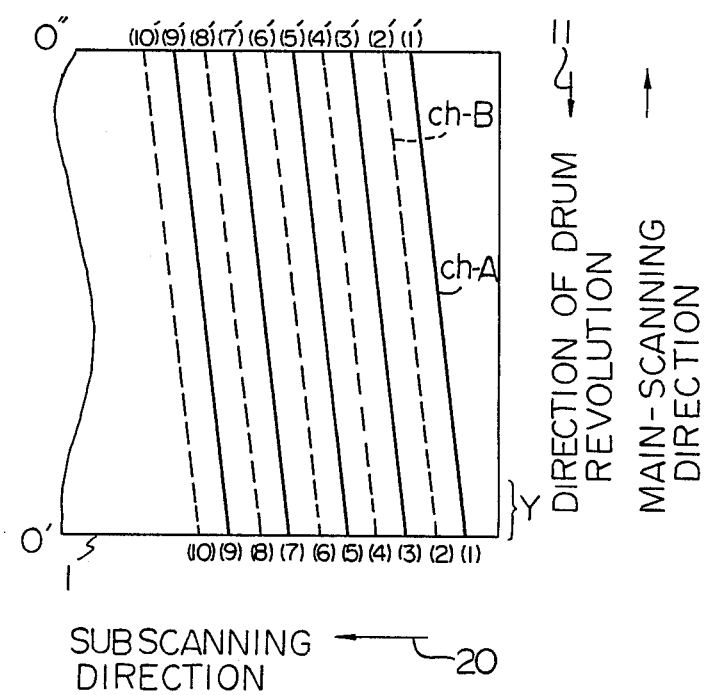
FIG. 5 is a diagram showing loci of scanning.

FIG. 5 shows the loci of ch-A and ch-B on the recording drum 1 when the latent image is formed by using the recording head. Namely, FIG. 5 is an expansion view of the recording drum 1; i.e., the position 0 of FIG. 2 is expanded. Therefore, the lower end 0' and the upper end 0'' are located at the same position 0 on the recording drum 1. The locus of main scanning of the first line of ch-A starts from (1) of 0' and ends at (1)' of 0'', as indicated by a solid line. The point (1)' of 0'' is the same as the point (3) of 0'. Then, the main scanning of the third line is effected from (3) of 0' to (3)' of 0''. Thus, ch-A deals with the recording of the latent image of lines 1, 3, 5, . . . (2n−1) (n being an integer greater than 1). Likewise, ch-B describes loci starting from the second line (2) →(2)', (2)'→(4), (4) →(4)', as indicated by broken lines. Namely, ch-B deals with the recording of the latent image of 2n lines.

Figure 6:
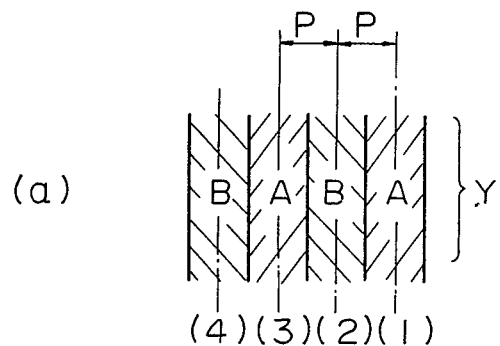
FIG. 6 is a view showing a portion of FIG. 5 on an enlarged scale.
Figure 6:
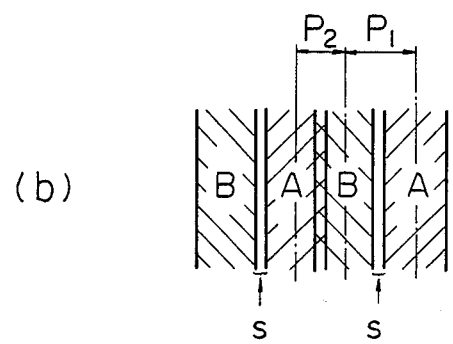

FIG. 6 illustrates, on an enlarged scale, the lower end (portion Y) of FIG. 5. The loci of ch-A are indicated by hatched portions ascending toward the upper right, and the loci of ch-B are indicated by hatched portions descending toward the lower right. FIG. 6(a) represents the ideal loci of ch-A and ch-B maintaining a pitch P covering the whole regions on the recorded drum 1 without gap. In practice, however, it is difficult to provide ch-A and ch-B having an equal tracking width. It is also difficult to eliminate errors that stem from the tracking differences of ch-A and ch-B and the moving quantity of subscanning. The latter problem involves not only errors resulting from the machining precision but also vibration resulting when the recording head 2 moves in the subscanning direction. Therefore, subscanning involves variance in the feeding pitch. In the practically described loci, therefore, pitches $P_1$, $P_2$ between lines become unequal as shown in FIG. 6(b); therefore, regions s appear that are not covered by either the loci of ch-A or ch-B. The regions s do not absorb magnetic toner. When developed, therefore, white stripes appear in the picture. White stripes are especially conspicuous when a black picture is described on the whole surface, thereby resulting in poorer picture quality.

FIG. 7(a) is a view illustrating, on an enlarged scale, the tip portions of ch-A and ch-B (portion C surrounded by two-dot chain line of FIG. 4) of the recording head 2 of the present invention. The tracking width a of ch-A is narrower than the tracking width b of ch-B. FIG. 7(b) illustrates the loci described by the recording head, in which the abscissa represents the number of lines and the ordinate represents the number of scannings. The loci represents a portion Y of FIG. 6. The gap E between the track of ch-A and the track of ch-B is selected as an odd number of times of the line pitch P. For instance, P=0.1 mm, a=0.1 mm, b=0.16 mm, E=0.9 mm, and core width F of ch-A and ch-B is 0.3 mm. Since E=9P, ch-A and ch-B simultaneously describe the lines that are spaced apart by a distance equal to the width of nine lines. In FIGS. 7(a) and 7(b), ch-A describes the fifth line, and ch-B describes the 14th line. In the first scanning, ch-B describes the second line. The locus has a width b=0.16 mm. In FIG. 7(a), ch-A has not yet been located at the position of the first line, and no current is allowed to flow into the coil 23 of ch-A. The flow of current is controlled by a recording head control circuit 200 shown in FIG. 2. The recording head 2 moves by 2P while the recording drum 1 rotates once, and the ch-B describes the fourth line through the second scanning. The moving quantity 2P is controlled by the subscanning control device 210 shown in FIG. 2. In the fifth scanning, ch-B describes the 10th line, and ch-A describes the first line. In the sixth scanning, ch-B describes the 12th line, and ch-A describes the third line. In the seventh scanning, ch-B describes the 14th line, and ch-A describes the fifth line. The tracking width (a=0.1 mm) of ch-A is set to be nearly equal to the line pitch P(=0.1 mm). Ch-A, which scans lagged behind ch-B, fills up the space between the loci described by ch-B. In this case, since a+b(=0.26 mm) is set to be greater than 2P (=0.2 mm), the locus of ch-A partly overlaps the loci of ch-B. In the first line, for instance, the locus of ch-B protrudes beyond the second line by (b-P)/2(=0.03 mm). Therefore, the locus of ch-A overlaps the locus of ch-B by a width of $l_1$=(b-P)/2. By effecting the saturation recording, however, the overlapped portion can be completely rewritten into the locus of ch-A. Similarly, when the ch-A describes the third line, the locus overlaps the second locus of ch-B by $l_2$ and overlapped the fourth locus of ch-B by $l_3$, and the overlapped portions are rewritten into the locus of ch-A. Here, $l_2 = l_3 = l_1$. Consequently, the locus of ch-B is rewritten into $b - (l_1 + l_2) = P(=a)$. Therefore, the synthesized loci of both ch-A and ch-B assume the width P as shown in FIG. 7(c).

Here, let it be considered that the center of the track of ch-B is deviated by a quantity q. This is caused, for example, from the fact that it is difficult to obtain a distance E between the tracks to be exactly an odd number of times the pitch P. As shown in FIG. 7(d), the locus of the first line of ch-A overlaps the second locus of ch-B by $l_4$, and the locus of third line of ch-A overlaps the second locus of ch-B by $l_5$, and the overlapped portions are rewritten into the locus of ch-A. Consequently, loci each having a width P are left as shown in FIG. 7(e). If $l_4 \geq 0$, the loci appear as if q=0.

The recording head 2 moves by 2P in the subscanning direction after each rotation of the recording drum 1. Due to the vibration, however, variance is imparted to the individual moving pitches. For instance, when the tracking centers are deviated from the subscanning centers by $q_1$, $q_2$, $q_3$, $q_4$, $q_5$ as shown in FIG. 7(f), the synthesized loci will become as shown in FIG. 7(g). In this case, the width of loci of ch-A is equal to the tracking width a of ch-A, but the width of loci of ch-B is $b_2 > a(=P) > b_4$. By suitably selecting the overlapping amount $l(l_1, l_2, l_3, l_4)$, however, development of white stripes s of FIG. 6 can be prevented. According to the visual test conducted by the inventors, the picture appears unnatural if there exist even minimal white stripes (e.g., 0.01 to 0.02 mm) in the black portions. The picture, on the other hand, does not appear so unnatural even when the widths of black lines are slightly changed (e.g., over a range of 0.1 0.01 to 0.02 mm). In other words, a slight change in the width of loci of ch-B is permissible.

Figure 7:
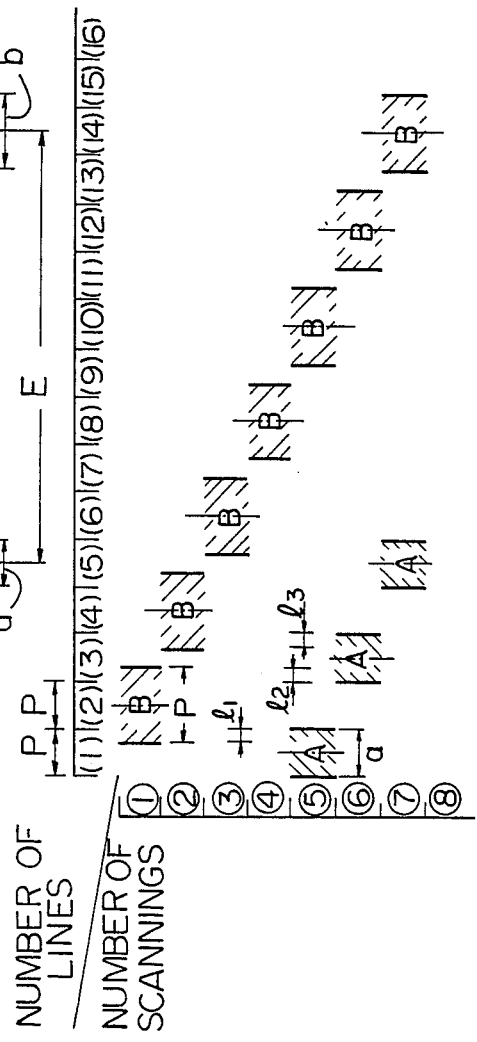
FIG. 7 is a diagram for illustrating the formation of a latent image by using the recording head of the present invention.
Figure 8:
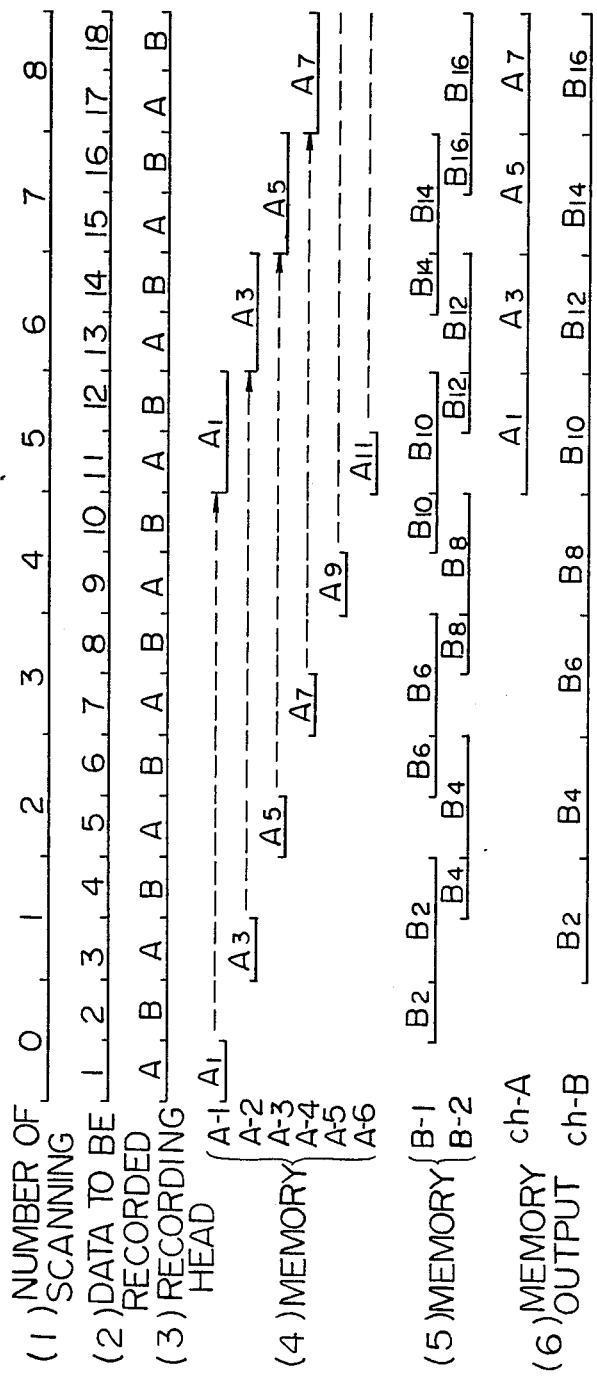
FIG. 8 is a time chart for recording the data in accordance with the order as shown in FIG. 7.

FIG. 8 shows a time chart for recording the data in accordance with the order as shown in FIG. 7. In FIG. 8, (1) illustrates the number of the scannings of the recording head shown in FIG. 1. FIG. 8 (2) illustrates the data which should be recorded, the data for two lines are included in every one scanning. FIG. 8 (3) illustrates the relation between each channel of the recording head 2 shown in FIG. 1 and the recording data of the line. As shown in FIG. 7 (b), in the first line, the fifth scanning records ch-A. This corresponds to FIG. 8 (4). As shown in a memory A-1 in FIG. 8 (4), the recording data of first line is stored in the memory, for example, a random access memory, and, in the fifth scanning, this recording data corresponding to the first line is read out and recorded in the recording drum 1 at a portion of ch-A. The capacity of the memory is selected as 4 K bits so as to store the recording data of one line. Similarly, in the second line, the first scanning reads ch-B. This corresponds to FIG. 8 (5). That is, in a memory B-1 in FIG. 8 (5), the recording data of the second line is stored in the memory, and, in the first scanning, this recording data corresponding to the second line is read out so as to be recorded in the recording drum 1 at a portion of ch-B. Similarly, the third line, the fifth line, ... are stored in the memories A-2, B-2, ... in order, and, in the scannings shown in FIG. 7 (b), the data corresponding to the third, the fifth lines, ... are read out so as to record in the recording drum 1 at ch-A and ch-B. FIG. 8 (6) shows the outputs of each memory. As clear from the time chart of FIG. 8, the memory for ch-A requires the content corresponding to six lines and the memory for channel B requires the content corresponding to two lines, and the memory of each line is formed, for example, as the content of 4 K bits.

Figure 9:
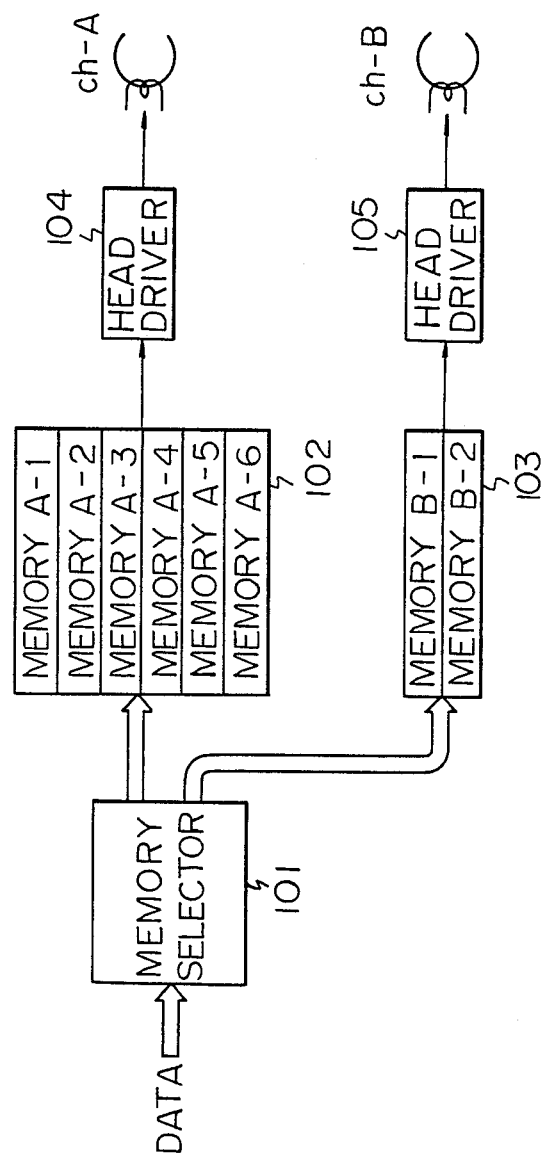
FIG. 9 shows a block diagram for recording the data according to the present invention.

FIG. 9 shows the block diagram for recording the data in accordance with the time chart shown in FIG. 8. In FIG. 9, the data to be recorded are supplied to a memory selector 101. The memory selector 101 distributes the input data to memories 102 and 103. In the embodiment shown in FIG. 8, the data in the first line is supplied to a memory 102, and the data in the second line is supplied to a memory 103. Similarly, the data in the third, the fifth lines ... are supplied to the memory 102 and the data in the fourth, the sixth line, ... are supplied to the memory 103. The data stored in the memories 102 and 103 are output at the time shown in FIG. 8 (6), so as to input the recording head via head drivers 104 and 105. The output of the memory 102 is recorded by ch-A and the output of the memory 103 is recorded by ch-B. As already disclosed, the tracking width of ch-A is selected narrower than that of ch-B, and the recording head of one channel moves in such a manner that the loci described by said one channel is overlapped by part of the loci described by the succeeding channel.

FIG. 10 illustrates a second embodiment in which the head has four channels. FIG. 10 (a) is a view showing, on an enlarged scale, the tips of cores of the recording head 2 and corresponds to FIG. 7 (a). The channels ch-A, ch-B, ch-C, and ch-D have different tracking widths a, b, c, and d. For instance, a=0.1 mm, b=0.15 mm, c=0.2 mm, d=0.3 mm, line pitch P=0.1 mm, distance between the centers of cores $G_1=G_2=G_3=0.9$ mm, distances between the centers of tracks $E_1=0.875$ mm, $E_2=0.875$ mm, $E_3=0.95$ mm, and core width $F_1=F_2=F_3=F_4=0.3$ mm. FIG. 10 (b) shows loci described by the channels ch-A, ch-B, ch-C, and ch-D of the recording head through the scanning, and FIG. 10 (c) shows the synthesized loci. Ch-A deals with lines 1, 5, ... (4n−3) (n is an integer greater than 1), ch-B deals with lines 2, 6, ... (4n−2), ch-C deals with lines 3, 7, ... (4n−1), and ch-D deals with lines 4, 8, ... 4n. FIG. 10 is a diagram of when the eighth scanning is finished. In the first scanning, ch-D is positioned at the fourth line and describes the locus maintaining the width d(=0.3 mm). Other cores have not yet been energized. In the second scanning, ch-D describes the locus of the eighth line. In the third scanning, ch-D describes the twelfth line. At the same time, ch-C describes the locus of the third line. Here, the locus of the third line of ch-C overlaps the locus of the fourth line of ch-D by an amount $l_3$; the overlapped portion of the locus of ch-D is rewritten into the locus of ch-C. In the fourth scanning, likewise, ch-D describes the locus of the 16th line, and ch-C describes the locus of the seventh line. In the fifth scanning, ch-D describes the locus of the 20th line, ch-C describes the locus of the 11th line, and ch-B describes the locus of the second line. The locus of ch-B overlaps the locus of ch-C by $l_2$, to rewrite it. In the sixth scanning, ch-D describes the locus of the 24th line, ch-C describes the locus of the 15th line, and ch-B describes the locus of the sixth line. In the seventh scanning, ch-D describes the locus of the 28th line, ch-C describes the locus of the 19th line, ch-B describes the locus of the 10th line, and ch-A describes the locus of the first line. The locus of ch-A overlaps the locus of ch-B by $l_1$ to rewrite it. In the eighth scanning, ch-D describes the locus of the 32nd line, ch-C describes the locus of the 23rd line, ch-B describes the locus of the 14th line, and ch-A describes the locus of the fifth line. The locus of ch-A overlaps the locus of ch-B by $l_1$ and overlaps the locus of ch-D by $l_4$, to rewrite them. At this moment, the formation of latent image has been completed from the first line to the seventh line. Each of the completed loci has the width P.

The formation of the latent image thus proceeds. Recording is made by four lines after each scanning (after each rotation of the recording drum 1), and the recording head 2 moves by 4P in the subscanning direction.

In the above embodiment, the tracking widths of the cores were selected to be d>c>b>a. The tracking widths, however, can be freely selected provided the requirements d>a, c>a, b>a, are satisfied. Further, the distance G between the cores, core width F, distances E between the centers of tracks, and the number of channels need not be limited to the above-mentioned examples. The principle of the present invention can also be adapted to a thin-film integrated head, perpendicularly magnetized head, and the like.

According to the present invention, as illustrated in the foregoing, the tracking width of a preceding channel is selected to be wider than the tracking width of a succeeding channel, so that the locus described by the succeeding channel partly overlaps the locus described by the preceding channel. Therefore, it is possible to obtain copies of high picture quality.

We claim:

1. A method of forming latent image in a magnetic printing apparatus, characterized in that use is made of a recording head having a plurality of channels with different tracking widths, a locus is described by a preceding channel having a wide tracking width, another locus is described being partly overlapped on said locus by using a succeeding channel having a narrow tracking width, and the width of locus described by the preceding channel is so corrected as to become nearly equal to the tracking width of the succeeding channel, while the overlapped portion of said locus is rewritten into the succeeding channel.

2. A method of forming latent images in a magnetic printing apparatus comprising the steps of:
   a. recording latent images on a plurality of channels of different widths as measured in the main scanning direction, the tracking locus of each of said differentwidth channels corresponding to a different number of lines in the sub-scanning direction;

b. controlling the recording by selecting and driving at least two channels of different widths such that the line-recorded latent images of a wider channel are reduced in width by subsequently recorded latent images of a succeeding narrower channel which overlaps an edge portion of said wider channel, thereby to provide data tracks in the sub-scanning direction which are of substantially equal width as measured in the main scanning direction, and without unrecorded line space therebetween.

3. The method of claim 2 including selecting one of a plurality of available line densities by selecting at least two channels out of a larger number of channels having different channel widths.

4. The method of claim 3 wherein the latent image signals of a narrower channel are retained in memory until after the latent image signals of a wider channel have been recorded.

* * * * *